United States Patent [19]

Frank

[11] 4,107,648

[45] Aug. 15, 1978

[54] SCAN ENCODING OF TWO DIMENSIONAL PICTORIAL ENTITIES

[75] Inventor: Amalie Julianna Frank, Chatham Township, Morris County, N.J.

[73] Assignee: Bell Telephone Laboratories, Incorporated, Murray Hill, N.J.

[21] Appl. No.: 675,926

[22] Filed: Apr. 12, 1976

[51] Int. Cl.² .............................................. G06K 9/12
[52] U.S. Cl. ............................ 340/146.3 H; 358/261
[58] Field of Search ................. 178/DIG. 3, 5, 6, 6.8; 340/203, 204, 206, 146.3 H, 146.3 CA, 146.3 Y; 325/38 R, 38 B, 38 A; 358/260–262, 282; 235/92 PC

[56] References Cited

U.S. PATENT DOCUMENTS

| | | | |
|---|---|---|---|
| 3,408,485 | 10/1968 | Scott et al. | 340/146.3 Y |
| 3,801,737 | 4/1974 | Komura et al. | 178/DIG. 3 |
| 3,956,580 | 5/1976 | Murayama | 178/DIG. 3 |

OTHER PUBLICATIONS

Grimsdale et al., "A System for the Automatic Recognition of Patterns," *Proc. of I.E.E.*, vol. 106, Pt. B, No. 26, Mar. 1959, pp. 210–221.

Frank, "High Fidelity Encoding of Two-Level, High Resolution Images," *IEEE Int. Conf. on Communications*, Session 26, Jun. 1973, pp. 5–10.

*Primary Examiner*—Leo H. Boudreau
*Attorney, Agent, or Firm*—Henry T. Brendzel; Robert O. Nimtz

[57] ABSTRACT

A graphic arts image is partitioned into two-dimensional geometrically related pictorial entities known as "blobs" which are susceptible of identification by a number of parameters. An entire picture is scanned, a line at a time, and encoded with variable length Elias and Huffman codes, where the Huffman codes are in accordance with the relative frequencies of particular blob parameters of an ensemble of images, of which the images scanned are particular members thereof. The codes of each scanned line are generated, in real time, solely by comparisons with the immediately preceding scanned line.

8 Claims, 10 Drawing Figures

SCAN ENCODING OF TWO DIMENSIONAL PICTORIAL ENTITIES

BACKGROUND OF THE INVENTION

1. Field of the Invention

The present invention relates to apparatus and methods for the coding, storing, and transmitting of graphical information. More particularly, the present invention relates to apparatus and methods for generating, storing and/or transmitting coded representations of high fidelity graphic art images suitable for the photocomposition of printed materials, for facsimile, and for other similar applications.

2. Description of the Prior Art

General Prior Art

Recent years have witnessed greatly increased usage of automatic means for composing and printing page copy for use in directories, catalogs, magazines and other printed works. An important aspect of such photocomposition schemes is the coding and storage of machine-compatible signals representative of graphical source information. In particular, when pictorial information and/or high-resolution type fonts are to be used, it has been found necessary to identify, by scanning with great particularity, the individual graphical entities associated with the source material. To permit the further processing of these data it has usually been necessary to store them in memories having substantial capacity. Often these data are stored for long times, as when they are to be used in successive issues of a book, magazine or the like. Because typical published materials, especially photographic or other picture materials are so diverse, and because the information content of such materials is so great, the volume of data required to be stored is potentially very large. It is especially important therefore that these data be stored in as efficient a manner as possible.

In other applications, it may be desired that printed or graphic art information to be transmitted to a remote location and there be photocomposed, displayed, printed, or otherwise employed. In such applications, it may not be necessary to store the coded information at either the sending or the receiving ends. Nevertheless, it is important that the coding of such graphic source information be simple and inexpensive to implement as well as compact and conserving of transmission bandwidth.

A number of particular coding and storage schemes have been developed for efficiently storing and transmitting information. For example, the variable length codes described in Elias, "Predictive Coding", *IRE Transactions Information Theory*, March 1955, have proved to be useful in many variations. The well-known Huffman codes described, for example, in Huffman, "A Method for the Construction of Minimum Redundancy Codes," *Proceedings IRE*, Septemter 1952, pp. 1098-1101, and Fano, *Transmission of Information*, the MIT Press, 1961, pp. 75-81, offer optimum efficiency under particular circumstances. The application of these techniques to graphical information has generally been limited to one-dimensional coding, i.e., coding of signals associated with a single scan line in the source copy.

U.S. Pat. No. 3,461,231 issued Aug. 12, 1969, to R. V. Quinlan described a system for performing limited two-dimensional encoding. However, his techniques are limited to transmitting only an indication of the differences between data corresponding to two successive scan lines. A related technique is presented in Tyler, "Two Hardcopy Terminals for PCM Communications of Meteorological Products," *Conference Record, 1969 International Conference on Communications,* June 9-11, 1969, pp. 11-21 through 11-28. Tyler encodes his data (meteorological information) in terms of differential lengths for run lengths on two successive scan lines. Similarly, J. E. Elliot, U.S. Pat. No. 3,686,631 issued Aug. 22, 1972, describes a system which encodes the differences between data corresponding to successive scan lines, and S. Kagan et al, U.S. Pat. No. 3,347,981, issued Oct. 17, 1967, described a system with similar encoding, termed "exclusive transitions", which in some sense, relates to the second derivative of the transmitted image. Huang, in "Run-Length Coding and Its Extensions", *Picture Bandwidth Compression,* Huang and Tretiak (Eds.), Gordan and Breach, New York 1972, pp. 231-264, discusses some extensions to the work of Tyler.

Other two-dimensional coding of picture information is described in D. N. Graham, "Image Transmission by Two-Dimensional Contour Coding," *Proceedings of the IEEE,* Vol. 55, No. 3, March 1967, pp. 336-345.

The above-cited Quinlan and Tyler references indicate a need to determine not only what is encoded, i.e., which parameters are encoded, but also exactly how these parameters are to be encoded. The latter aspect of the problem is also treated in U.S. Pat. No. 3,643,019, issued Feb. 15, 1972, to J. P. Beltz. Particular reference is made by Beltz of the applicability of his techniques in commercial photocomposition systems such as the RCA VIDEOCOMP Series 70/800. Although Beltx applies a variable-length coding to segments defining a "zone", each such zone is the area defined by a single scan line. Beltz does not attempt to extend his results to two-dimensional coding. Likewise, though Graham and Huang speak of Huffman codes, their application is to very specific geometric entities.

Specific Prior Art

In the *IEEE International Conference on Communications,* June 1973, I have pesented a paper which describes a new method for encoding two-level images. This paper, which is entitled "High Fidelity Encoding of Two-Level, High Resolution Images", has been published in the *Conference Record, IEEE International Conference on Communications,* June 1973, Session 26, pp. 5-10. This method is considerably more compact than the above-described prior art methods because it decomposes a picture into large meaningful units, or entities, called "blobs", and defines those units in a unique manner which takes advantage of the statistics of the information.

In overview, the encoding process described in the above Conference Record publication consists of four phases. In the first phase, the image is scanned, sample, converted to digital form, and quantized into two brightness levels. In the second phase, the individual blobs are defined for both brightness levels, stored in intermediate form, and the pertinent blob statistics are collected. In the third phase, efficient codes based on the statistics collected in the second phase are determined and a determination is made also based on the statistics as to which brightness level will require the minimum number of coding bits. In the fourth phase, the intermediate form of the blobs of the determined brightness level is encoded with the codes derived from the third phase, generating thereby the various blob parameters.

With respect to the blob definition, in accordance with the published method, a blob is taken to consist of a number of runs of picture elements (pels) of the same level, which on successive runs satisfy the following conditions. Runs on two successive lines are part of the same blob if their run-beginnings are no more than J pels apart and their run-endings are no more than J pels apart and no two runs in the same line belong to the same blob. Experimentation has yielded an optimum J value of 3. A blob is encoded by encoding the length of the first run in the blob (the head run), the connection pattern of the run-beginnings and runendings of successive runs, if any, the blob position and the occurrence of the last run in the blob (called the tail run).

A more complete description of this encoding method can be found by perusing through the aforementioned *Conference Record* article which is herein incorporated by reference. A still more complete description of this encoding method may be found in my copending application Ser. No. 425,506 filed Feb. 12, 1973, which is also herein incorporated by reference.

The aforementioned blob encoding method which encodes one blob at a time is efficient in respect to the encoding bits requirements, and thus is conserving of storage space when the encoded information of a complete page of graphic data is desired to be stored. However, since in encoding the blob parameters each blob is fully encoded before the next blob is processed, the described method proves non-optimum for facsimile applications where it is desired to transmit information in real time (essentially), and where it is highly desirable to encode and to transmit information in a highly systemized manner, such as on a line by line basis, without depending on large storage means for storing the blobs information for a complete image page at a time.

It is an object of this invention, therefore, to employ the blob encoding in a facsimile mode of operation.

It is another object of this invention to employ a blob encoding method that is fast and simple.

It is a further object of this invention to encode the information of various blobs on a line by line basis.

It is a still further object of this invention to provide fast and efficient means for generating and transmitting the encoded information in essentially real time.

One method of blob encoding suitable for facsimile applications which is similar to the methods described herein is presented in "Efficient Coding of Two-Tone Image Ensembles", A. J. Frank et al, *Proceedings, Missouri Symposium on Advanced Automation,* University of Missouri, Columbia, Mo., April 14–16, 1975, pp. 87–94.

SUMMARY OF THE INVENTION

The above and other objects of the invention are realized by a simple encoding method, which is implemented by compact and efficient apparatus. Encoding is accomplished by placing the information of a full scan (line) in a first register, and the information of the subsequent full scan in a second register. Means are provided for scanning the stored information in each of the two registers and for comparing the run-beginnings and run-ends of the various encountered runs of the brightness level to be encoded, (hereinafter referred to simply as runs), in both registers to ascertain the relationships therebetween. Runs in the second register which are concluded to be unrelated to runs in the first register are defined as head runs and are encoded with a modified Huffman code indicating the length of the head run. Runs in the first register which are concluded to be unrelated to runs in the second register are defined as tail runs and are encoded with a Huffman code indicating the occurrence of such a run. Second register runs which are related to first register runs are defined as connecting runs and are encoded, with a Huffman code indicating the relationship between the two runs. The distances between the blobs are encoded with an Elias code.

BRIEF DESCRIPTION OF THE DRAWINGS

The foregoing and other objects, features and advantages of the invention will be apparent from the following more detailed description of the invention read in conjuncion with the accompanying drawings, wherein.

DETAILED DESCRIPTION

In dealing with an image having only two tones, the encoded form consists of a description of the shapes and positions of the blobs of only one of the two tones. Optimumly, the tone of the encoded blob is that one tone which requires the smallest number of encoded bits. In some applications, the choice of the tone encoded is best determined as part of the encoding process itself e.g., by encoding both tones and by then choosing the one requiring fewer encoding bits. This is particularly feasible and particularly advantageous where the data is coded but once, is placed in a long term store, and is accessed many times, as for example, encoding for photocomposition purposes of font definitions and of images such as trademarks.

On the other hand, in a facsimile operation where the data is processed only once, it is best to decide at the outset which tone is to be encoded, and to reduce thereby the processing complexity and the time required to transmit the information as to the particular code employed. For example, for business letters and for positive engineering drawings, black blobs are generally preferable, while for blueprints and some trademarks, white blobs are generally preferable. The codebook employed in such applications may be comprised of fixed predetermined codewords, contructed from a previous study of an ensemble of images to which the transmitted image belongs. Alternatively, a facsimile device can incorporate a fast pre-scan to determine the tone which is most advantageous to encode, and/or the ensemble to which the transmitted image belongs.

For the purpose of this disclosure the tone to be encoded is called the non-background image and is assigned the logic value "1", while the tone not encoded is called the background image and is assigned the logic value "0".

In accordance with the encoding process of this invention, an image page is processed by scanning consecutive lines of the page, by detecting uninterrupted strings of non-background image pels (runs) of logic level "1" and by systematically correlating the detected runs in each line with the runs in the immediately preceding line. Further in accordance with this invention, a run in a line is said to connect to a run in a previous line and to comprise a part of a blob, if the beginning and end of the tested run are within ±J pels of the beginning and end of a run in the previous line, respectively, and if the tested run is the first run that meets the above test in the orderly sequence of processing. For purposes of this disclosure, J is selected to equal 3.

Figure 1:
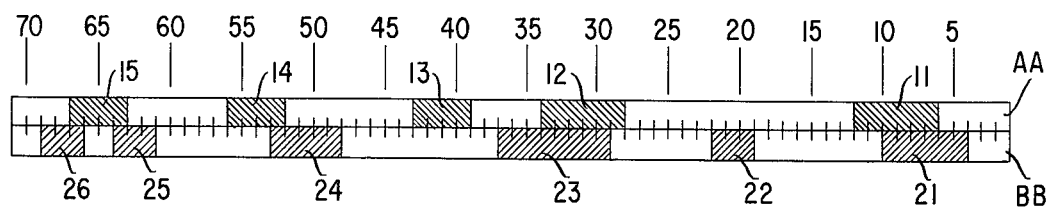
FIG. 1 illustrates various run connections in two scan lines of an image page.

The method contemplated by the invention in correlating the runs of adjacent lines can best be explained with the aid of FIG. 1 which depicts the scans of two lines, AA and BB, having cross hatched non-background image pels. Before proceeding with the description, however, the reader in invited to study FIG. 1, to keep in mind that runs begin on te right and terminate on the left, and to observe the following:

1. Runs 11 and 21 connect because the beginning and end of run 21 are within ±3 pels of the beginning and end of run 11, respectively. Runs 11 and 21, therefore, require a "connect code". A "connect code" requires only an identification of the relative positions of the run-beginnings and the run-ends. For J=3 there are seven valid positions for the run-beginnings and seven valid positions for the run-ends, or 49 different possible connection codes.
2. Run 22 is a head run because (a) it cannot connect to run 11 for run 11 is already connected to run 21 and (b) it cannot connect to run 12 for it is too far therefrom. Run 22 requires, therefore, a "head code". A "head code" is characterized by the run length (in number of pels) and the run's position. A run's position is defined as the distance (in number of pels traversed) between the beginning of the head run and the end of the previous run, whatever that previous run might be and wherever the previous run may be situated (in the same or in a previous scan).
3. Runs 12 and 23 connect for the reasons stated in reference to runs 11 and 21.
4. Run 13 is a tail run because it cannot connect to either run 23 or run 24, for the distance is too great, and it also cannot connect to run 23 because run 23 is connected to run 12. A tail run is encoded by a single code indicating simply the occurrence of such a run, with no metric property.
5. Runs 14 and 24 do not connect because the run-beginnings of runs 14 and 24 are too far apart. Since run 14 is to the left of run 24, run 24 cannot connect to any other run in line AA and is therefore a head run;
6. Run 14 is a tail run because it cannot connect to run 24 and because it is to far from run 25.
7. Runs 15 and 25 connect for the reasons stated in reference to runs 11 and 21;
8. Run 26 does not connect to run 15 although the extrema requirements are met, because run 15 is already connected to run 25. Since run 26 connects to no other run in line AA, run 26 must be a head run.

As the head runs, connecting runs, and tail runs are determined, it is necessary to encode the derived information so that it may conveniently be stored or transmitted. To that end, it proves convenient to consider the advantages flowing from the selection of particular codes for the various blob parameters. In particular, it proves advantageous to take the statistical properties of the encoded data into account, and to construct a code which utilizes a minimum number of bits for the particular statistical distribution of the data at hand. In facsimile applications, it may be beneficial to employ a single code which is optimized to a particular ensemble of images.

After careful consideration, it has been determined that the Huffman codes are well suited for encoding the run length parameter of the head code, the connection code, and the occurrence of a tail code, while an Elias code is well suited for encoding the distance parameter of the head code.

By way of example and in accordance with the Huffman encoding described in the aforementioned paper published in the *Conference Record* of the *IEEE International Conference on Communications,* Tables I and II together comprise one codebook of 93 distinct Huffman codes, illustrative of one acceptable code for a particular ensemble. Table I illustrates the 49 connect codes and 1 tail code.

TABLE I

| Difference between Extrema of Runs (Line AA-Line BB) | | Binary Code | Required No. of Bits |
|---|---|---|---|
| run beginnings | run ends | | |
| +3 | 3 | 11111100100 | 11 |
| +3 | 2 | 111111101010 | 12 |
| +3 | 1 | 1111100010 | 10 |
| +3 | 0 | 1111100011 | 10 |
| +3 | −1 | 111111101011 | 12 |
| +3 | −2 | 1111100100 | 10 |
| +3 | −3 | 11111100101 | 11 |
| +2 | 3 | 111111101100 | 12 |
| +2 | 2 | 111111101101 | 12 |
| +2 | 1 | 11101000 | 8 |
| +2 | 0 | 11101001 | 8 |
| +2 | −1 | 111100110 | 9 |
| +2 | −2 | 11101010 | 8 |
| +2 | −3 | 111100111 | 9 |
| +1 | 3 | 111101000 | 9 |
| +1 | 2 | 11101011 | 8 |
| +1 | 1 | 10110 | 5 |
| +1 | 0 | 1010 | 4 |
| +1 | −1 | 110100 | 6 |
| +1 | −2 | 11101100 | 8 |
| +1 | −3 | 111111101110 | 12 |
| 0 | 3 | 11111100110 | 11 |
| 0 | 2 | 1111100101 | 10 |
| 0 | 1 | 10111 | 5 |
| 0 | 0 | 0 | 1 |
| 0 | −1 | 11000 | 5 |
| 0 | −2 | 111101001 | 9 |
| 0 | −3 | 1111100110 | 10 |
| −1 | 3 | 11111100111 | 11 |
| −1 | 2 | 111101010 | 9 |
| −1 | 1 | 1101110 | 7 |
| −1 | 0 | 11001 | 5 |
| −1 | −1 | 110101 | 6 |
| −1 | −2 | 111101011 | 9 |
| −1 | −3 | 11111101000 | 11 |
| −2 | 3 | 11111101001 | 11 |
| −2 | 2 | 111101100 | 9 |
| −2 | 1 | 11101101 | 8 |
| −2 | 0 | 11101110 | 8 |
| −2 | −1 | 11101111 | 8 |
| −2 | −2 | 111111101111 | 12 |
| −2 | −3 | 111111110000 | 12 |
| −3 | 3 | 11111101010 | 11 |
| −3 | 2 | 1111100111 | 10 |
| −3 | 1 | 11111101011 | 11 |
| −3 | 0 | 111101101 | 9 |
| −3 | −1 | 11111101100 | 11 |
| −3 | −2 | 111111110001 | 12 |
| −3 | −3 | 1111101000 | 10 |

TABLE I-continued

| Difference between Extrema of Runs (Line AA-Line BB) | | Binary Code | Required No. of Bits |
|---|---|---|---|
| run beginnings | run ends | | |
| Tail Code | | 100 | 3 |

Table II illustrates an acceptable code for the run length portion of head codes, including three prefix codes. The three prefix codes are concatenated with a fixed number of subsequent bits, and are decoded by simply taking the binary value of the fixed number of catenated bits and adding that number to a constant, e.g., 41. For example, the first prefix code in Table II indicates that 5 bits are catenated. Accordingly, a code sequence 111001010110 indicates the first prefix code and five catenated bits 10110 which represent the value 22. Adding 41, results in a run length of 63 pels. Similarly, a code stream 111111000111000000011 indicates the third prefix code, and ten catenated bits 11000011 which represent the value 771 which added to 41 results in a run length of 812 pels.

TABLE II

| Head Run Length | Binary Code | Required No. of Bits |
|---|---|---|
| 1 | 110110 | 6 |
| 2 | 1101111 | 7 |
| 3 | 1110000 | 7 |
| 4 | 11110000 | 8 |
| 5 | 1110001 | 7 |
| 6 | 11110001 | 8 |
| 7 | 11110010 | 8 |
| 8 | 111101110 | 9 |
| 9 | 111101111 | 9 |
| 10 | 1111101001 | 10 |
| 11 | 111110000 | 9 |
| 12 | 1111101010 | 10 |
| 13 | 11111101101 | 11 |
| 14 | 11111101110 | 11 |
| 15 | 111111110010 | 12 |
| 16 | 111111110011 | 12 |
| 17 | 1111101011 | 10 |
| 18 | 11111101111 | 11 |
| 19 | 111111110100 | 12 |
| 20 | 111111110101 | 12 |
| 21 | 11111110000 | 11 |
| 22 | 111111110110 | 12 |
| 23 | 1111101100 | 10 |
| 24 | 111111110111 | 12 |
| 25 | 111111111000 | 12 |
| 26 | 1111101101 | 10 |
| 27 | 11111110001 | 11 |
| 28 | 1111101110 | 10 |
| 29 | 111111111001 | 12 |
| 30 | 11111110010 | 11 |
| 31 | 111111111010 | 12 |
| 32 | 111111111011 | 12 |
| 33 | 11111110011 | 11 |
| 34 | 111111111100 | 12 |
| 35 | 111111111101 | 12 |
| 36 | 1111101111 | 10 |
| 37 | 111111111110 | 12 |
| 38 | 1111110000 | 10 |
| 39 | 111111111111 | 12 |
| 40 | 11111110100 | 11 |
| prefix codes | 1110010 | 7 |
| | 1110011 | 7 |
| | 1111110001 | 10 |

For the distance parameter of the head run code, an Elias code of base 3 may be used with the binary state 11 representing the end-of-code comma. For example, a distance of 75 may be represented by $2 \times 3^3 + 2 \times 3^2 + 1 \times 3^1 + 0 \times 3^0$ or by 10 10 01 00 followed by the comma code 11.

Figure 2:
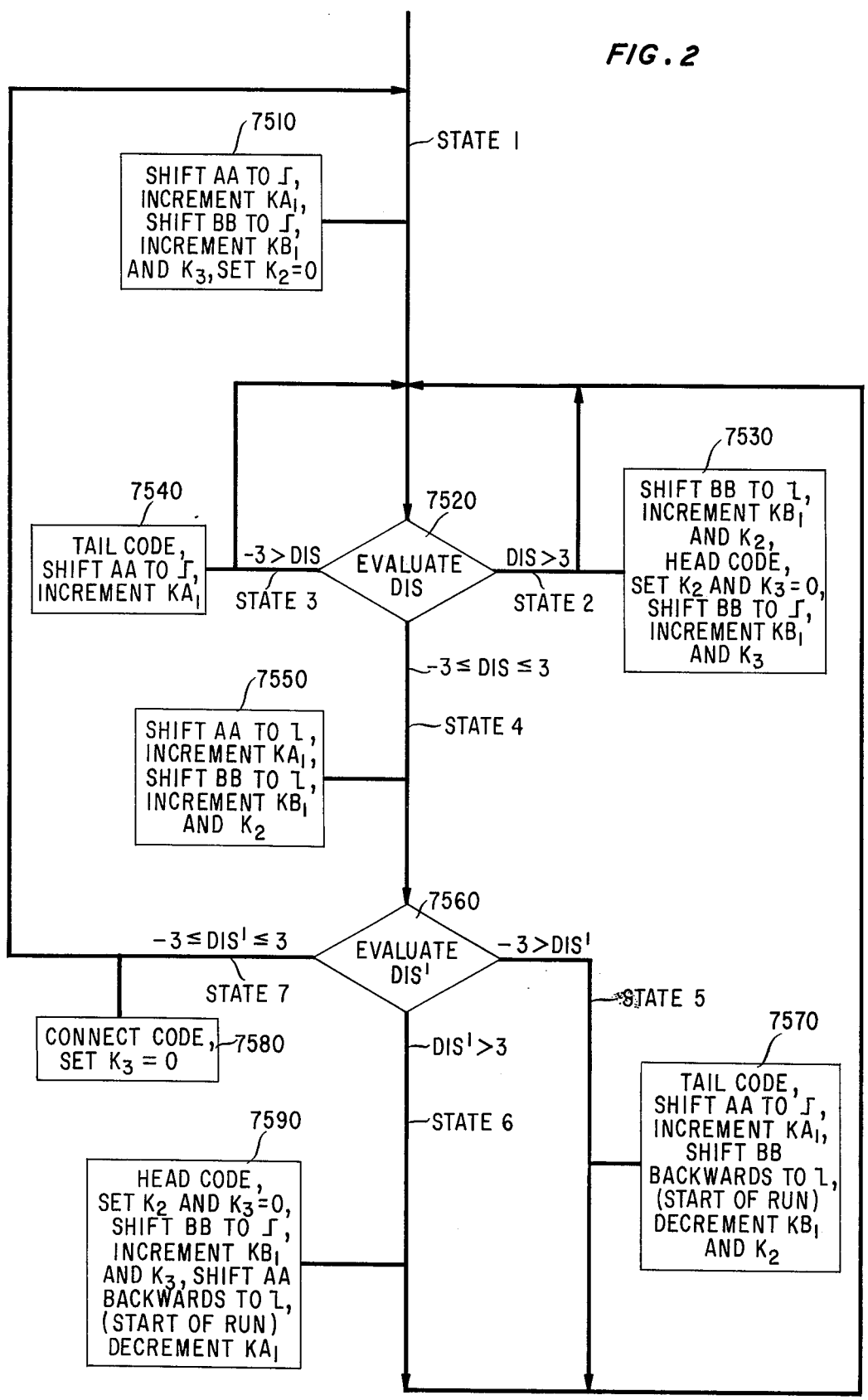
FIG. 2 is a flow diagram describin one method of this invention and the operational flow of the encoder of this invention.
Figure 3:
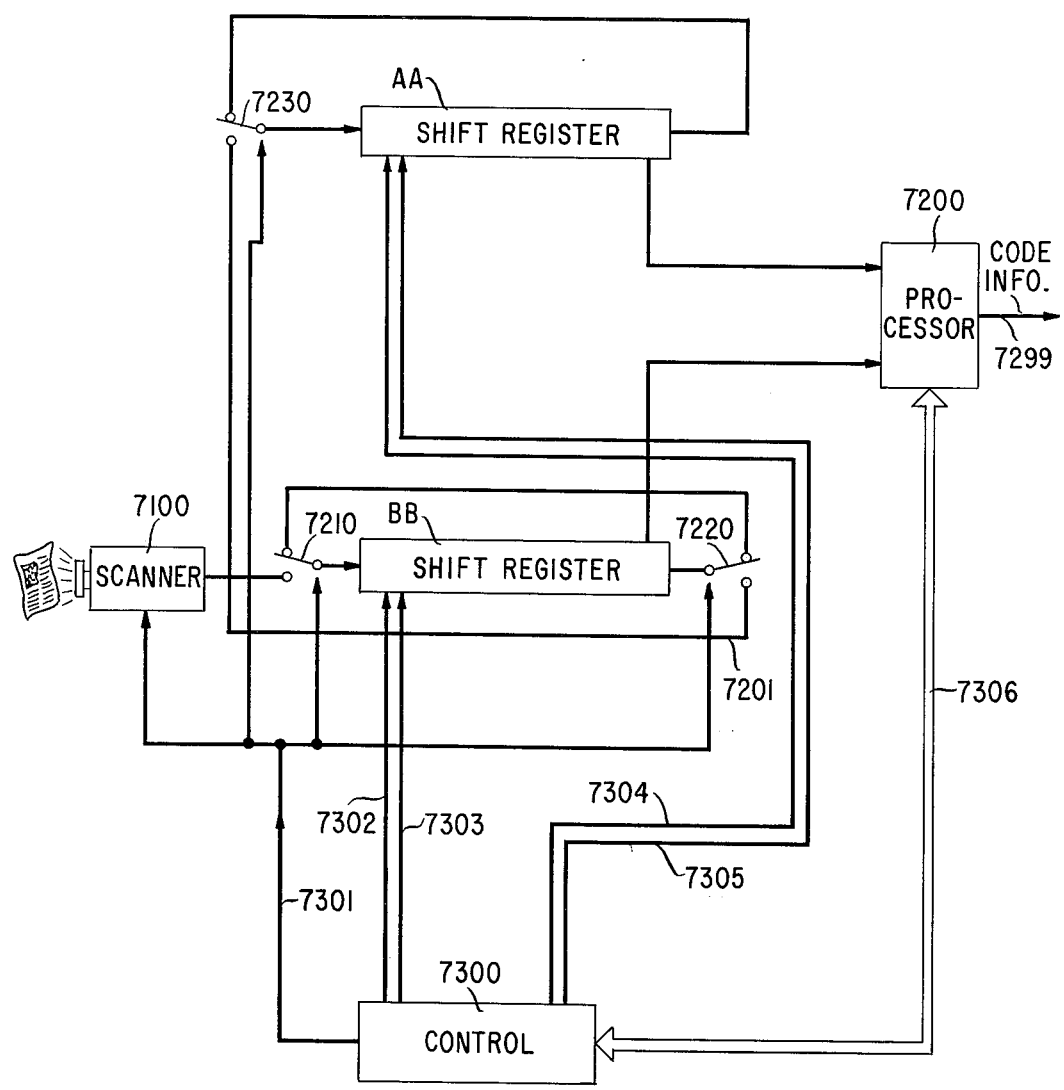
FIG. 3 is a general block diagram of the encoder implementing the method represented by FIG. 2.

Turning now to the general processing method of this invention, it may be seen that FIG. 3 depicts a general block diagram of an embodiment of apparatus for encoding blobs in accordance with the method of this invention. FIG. 2 is a diagram, showing the operational flow within the apparatus disclosed by FIG. 3, i.e., the various states that the apparatus assumes and the operations performed within each state. FIG. 2 may also be viewed as a flow chart from which a computer program may be constructed and implemented on a general purpose computer destined to emulate the hardware of FIG. 3. Such one to one correspondence is well known in the art.

At the logical beginning, or "front end", of the encoder on FIG. 3 is scanner 7100 which operates on an image to be encoded and scans the image sequentially, line by line. Scanner 7100 may be an optical scanner or a nonoptical scanner. A typical optical scanner is disclosed in U.S. Pat. No. 3,445,588 issued to J. F. Nicholson on May 20, 1969. Functionally equivalent scanning apparatus is disclosed in the above cited Beltz patent in connection with the RCA VIDEOCOMP, series 70/800, photocomposition system. Many other bit scanning devices may be used to generate signals representative of the image intensity along a scan line.

Thus, like other scanners, scanner 7100 provides a sequence of tone indications for individual picture elements. The actual definition of individual picture elements (pels) is accomplished, as in standard practice, by sampling the output of the scanner. Thus, the scanner internally develops a continuous signal not unlike that associated with standard television broadcast signals, and the associated circuits within the scanner sample the signal with a periodic clock signal, and quantize the sampled signal to represent non-background image pels with logic "1" bits and background image pels with logic "0" bits.

Operation of the encoder of FIG. 3 alternates between two phases, input and processing, under control of a control element 7300. In the input phase, the contents of a shift-right/shift-left register BB are transferred to shift-right/shift-left register AA through switch 7220, line 7201, and switch 7230, and scanner 7100 applies its output signal to register BB through a switch 7210. The scanner and switches 7210, 7220, and 7230 are controlled by line 7301. In the processing stage, switches 7210, 7220, and 7230 are switched so that register AA cycles upon itself, in either direction, through switch 7230, and register BB cycles upon itself, in either direction, through switches 7210 and 7220.

Processing of the scanned signals to develop the desired output codes is achieved by connecting an output signal from register AA and an output signal from register BB to a processor 7200, and by controlling registers AA and BB and processor 7200 with a control element 7300. Specifically, register AA is controlled with shift-right/shift-left clock signals 7302 and 7303 and register BB is controlled with shift-right/shift-left clock signals 7304 and 7305, and processor 7200 interacts with control element 7300 via a two-way bus line 7306.

Processor 7200, which is the main processing unit of the encoder, processes the information of each current scan (located in register BB) by comparing it to the information of the preceding scan (located in register AA). The exact manner by which the processing is accomplished can be appreciated by following the diagram of FIG. 2 in conjunction with the following description.

When data is shifted into registers AA and BB from register BB and scanner 7100, respectively, the encoder of FIG. 3 is placed in STATE 1. STATE 1 corresponds to block 7510 in FIG. 2. Block 7510 first indicates that register AA is to be shifted right one bit at a time (i.e. one pel at a time) until the next occurrence of an up-transition, (i.e. 0 to 1) indicating the beginning of a run. To provide for the case where a run begins with the first pel, an extra first bit with value "0" is inserted into registers AA and BB. This extra bit is used solely for transition detection purposes. Block 7510 also indicates that a counter $KA_1$ is to be incremented by one for each right shift of one bit in register AA. This counter keeps track of the position of the register AA pel being processed and provides an indication whenever the line in register AA has been processed completely. Block 7510 then indicates that register BB is to be shifted right one bit at a time until the next occurrence of an up-transition, indicating the beginning of a run, and for each right shift of one bit, counters $KB_1$ and $K_3$ are each to be incremented by one and that counter $K_2$ is to be set to "0". Counter $KB_1$ keeps track of the position of the register BB pel being processed and gives an indication whenever the line in register BB has been processed completely. Counter $K_2$ counts strings of "1" in register BB (non-background image runs). Counter $K_3$ counts strings of "0s" in register BB. Thus, counter $K_2$ provides an indication of run lengths in register BB and counter $K_3$ provides an indication of distances between runs. Accordingly, for a head run, counters $K_2$ and $K_3$ indicate the run length and the position of the head, respectively. Therefore, at that time of generating a head-code the contents of counters $K_2$ and $K_3$ are connected to subsequent circuits within processor 7200 to be converted within those circuits to the appropriate head-code for the run length and position of the head.

When the functions in block 7510 have been executed, STATE 1 terminates, and the distance, DIS, between the detected up-transitions in the registers AA and BB is measured in decision block 7520. The distance DIS is obtained by subtracting the contents of counter $KB_1$ from the contents of counter $KA_1$. DIS is positive if the register BB up-transition is closer to the beginning of the image line than the register AA up-transition, and it is negative if the register AA up-transition is closer to the beginning of the image line than the register BB up-transition. The encoder branches to STATE 2 if DIS is positive and greater than $+3$, to STATE 3 if DIS is more negative than $-3$, and to STATE 4 if DIS is between $\pm 3$, inclusive.

STATE 2, corresponding to block 7530 in FIG. 2, indicates that the run in register BB is a head run. Block 7530 indicates that register BB is to be shifted right one bit at a time until the next occurrence of a down-transition, i.e. 1 to 0, indicating the end of the run. Block 7530 also indicates that for each right shift of one bit, counters $KB_1$ and $K_2$ are each to be incremented by one. Upon reaching the down-transition counters $K_2$ and $K_3$ indicate the length and position of the head run. Block 7530 then indicates that the processor 7200 is to generate the appropriate head code indicated by the counters $K_2$ and $K_3$, and that these counters are then to be set to 0. Finally, block 7530 indicates that register BB is to be shifted right one bit at a time until the next occurrence of an up-transition, indicating the beginning of a run, and that for each shift of one bit that counters $KB_1$ and $K_3$ are to be incremented by one. STATE 2 now terminates, and the encoder returns to block 7520 to evaluate the distance between the start of the new run in register BB and the start of the previously identified but as yet unprocessed run in register AA.

STATE 3, corresponding to block 7540 in FIG. 2 indicates that the run in register AA is a tail run. Block 7540 indicates that a tail-run code is to be generated by processor 7200. Then block 7540 indicates that register AA is to be shifted right one bit at a time until the next occurrence of an up-transition, indicating the beginning of a run, and that for each right shift of one bit, counter $KA_1$ is to be incremented by one. STATE 3 now terminates and the encoder returns to block 7520 to evaluate the distance between the start of the new run in register AA, and the start of the previously identified but as yet unprocessed run in register BB.

STATE 4, corresponding to block 7550 in FIG. 2, indicates that the run-beginning connectivity test is met. Block 7550 indicates that register AA is to be shifted right one bit at a time until the next occurrence of a down-transition, indicating the end of the run. For each such right shift of one bit, counter $KA_1$ is incremented by one. Block 7550 also indicates that register BB is to be shifted right one bit at a time until the next occurrence of a down-transition, indicating the end of the run. For each right shift of one bit in register BB, counters $KB_1$ and $K_2$ are each incremented by one.

When the functions in block 7550 have been executed, STATE 4 terminates, and the distance, DIS', between the detected down transitions in the registers AA and BB is measured in decision block 7560. The distance DIS' is obtained by subtracting the contents of counter $KB_1$ from the counter $KA_1$. DIS' is positive if the register BB down-transition is closer to the beginning of the image line than the register AA down-transition, and it is negative if the register AA down-transition is closer to the beginning of the image line than the register BB down-transition. The encoder branches to STATE 5 if DIS' is more negative than $-3$, to STATE 6 if DIS' is greater than $+3$, and to STATE 7 if DIS' is between $\pm 3$, inclusive.

STATE 5, corresponding to block 7570 in FIG. 2, indicates that the register AA run is a tail run. Accordingly, a tail-run is generated by processor 7200. Then register AA is shifted right one bit at a time until the next occurrence of an up-transition, indicating the beginning of a run. For each right shift of one bit, counter $KA_1$ is incremented by one. At this point the register BB run just tested for connectivity is as yet unclassified. However, in making the run-end connectivity test, register BB was shifted to the end of that run. This run may prove to be a head run, or it may connect to a subsequent register AA run. In order to test for such a possible connection, register BB must first be shifted back to the beginning of that run. Block 7570 next indicates that this is to be done by shifting register BB to the left a bit at a time until the next occurrence of a down-transition, indicating the beginning of the run. (A down-transition in a left shift is an up-transition in a right shift). Shifting during the processing phase in either direction is nondestructive, since register BB cycles upon itself, i.e. any bit shifted out on the right of the register enters at the left of the register, and vice versa. Block 7570 also indicates that for each left shift of one bit, counters $KB_1$ and $K_2$ are to be each decremented by one. STATE 5 then terminates and the encoder returns to block 7520 to evaluate the distance between the start of the new register AA run and the start of the previously identified but as yet unprocessed run in register BB.

STATE 6, corresponding to block 7590 in FIG. 2 indicates that the register BB run is a head run. As register BB has already been shifted to the end of this run, counters $K_2$ and $K_3$ contain at this point the proper counts for the run-length and position of the head run. Accordingly, block 7590 indicates that the processor 7200 is to generate the appropriate head code indicated by the counters $K_2$ and $K_3$, and that these counters are then to be set to zero. At this point the register AA run just tested for connectivity is as yet unclassified. However in making the run-end connectivity test, register AA was shifted to the end of that run. This run may prove to be a tail run, or it may connect to a subsequent register BB run. In order to test for such a possible connection, register AA must first be shifted back to the beginning of the run. Block 7590 indicates that this is to be done by shifting register AA to the left a bit at a time until the next occurrence of a down-transition, indicating the beginning of a run. As for register BB, shifting during the processing phase in either direction in register AA is non-destructive. Block 7590 also indicates that for each left shift of one bit, counter $KA_1$ is to be decremented by one. STATE 6 now terminates and the encoder returns to block 7520 to evaluate the distance between the start of the new register BB run and the start of the previously identified but as yet unprocessed run in register AA.

STATE 7, corresponding to block 7580 in FIG. 2, indicates that the run-ending connectivity test is met. Since both the run-beginning and run-ending criteria are satisfied, it is concluded that the tested run in register BB connects to the run in register AA and forms a part of a blob to which the run in register AA belongs. Block 7580 indicates that processor 7200 develops and generates a connection code based on the values of DIS and DIS'. Block 7580 also indicates that counter $K_3$ is to be set to 0. After this, STATE 7 terminates, and the encoder returns to STATE 1 at block 7510.

If the counter $KA_1$ indicates that the register AA has been shifted an entire scan line before the counter $KB_1$ indicates such condition for register BB, then the encoder causes the evaluation of DIS at block 7520 to be such that STATE 2 is entered. Thus, to process any remaining runs in register BB, the encoder cycles between blocks 7520 and 7530, generating the appropriate head-code for each such run. Similarly, if the counter $KB_1$ indicates that the register BB has been shifted an entire scan line before the counter $KA_1$ indicates such condition for register AA, then the encoder causes the evaluation of DIS at block 7520 to be such that STATE 3 is entered. Thus, to process any remaining runs in register AA, the encoder cycles between blocks 7520 and 7540, generating the tail-code for each such run.

It may be observed that the registers AA and BB need not be shifted independently in detecting up-transitions and down-transitions, indicating run-beginnings and run-endings. Rather, the connectivity tests may be performed by shifting both registers simultaneously, and by stopping at the first up-transition in either register AA or BB (when searching for run-beginnings), and by comparing the other register at the point of stopping and within J pels further along from that point. A similar approach may be employed for detecting, comparing, and testing down-transition. This alternate processing method of this invention is described below. For both methods, however, it may be observed that sufficient logic may be employed to assure that all information regarding the connectivity of the encountered runs may be obtained with a single, uninterrupted pass of the data.

Figure 5:
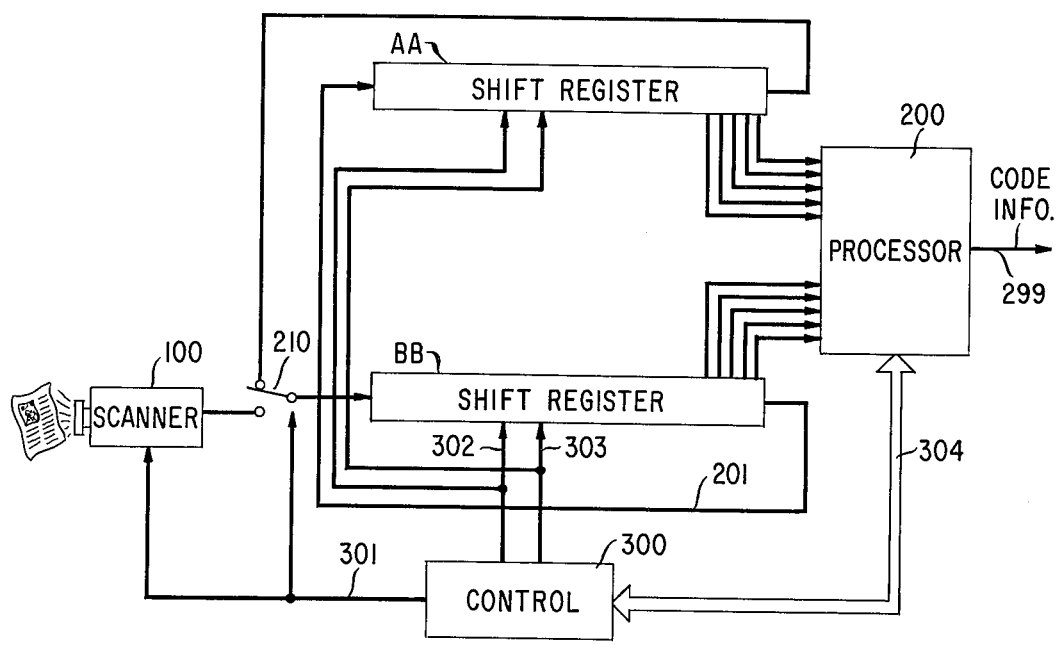
FIG. 5 is a general block diagram of the encoder implementing the method represented by FIG. 4.

We turn now to FIG. 5, which depicts a general block diagram of the second embodiment of apparatus for encoding blobs in accordance with this invention. Scanner 100 applies its output signal to a shift-right/shift-left register BB through a switch 210, and to a shift-right/shift-left register AA through register BB. Processing of the scanned signals to develop the desired output codes is achieved by connecting an equal plurality of output signals of registers AA and BB to a processor 200, and by controlling the scanner, switch 210, registers AA and BB, and processor 200 with a control element 300. Specifically, registers AA and BB are controlled with shift-right/shift-left clock signals 302 and 303, respectively, switch 210 is controlled by line 301, and processor 200 interacts with control element 300 via a twoway bus line 304.

Processor 200, which is the main processing unit of the encoder, processes the information of each current scan (located in register BB) by comparing it to the information of the preceding scan (located in register AA). The exact manner by which the processing is accomplished can be appreciated by following the diagram of FIG. 4 in conjunction with the following description.

When data is shifted into registers AA and BB from register BB and scanner 100, respectively, the encoder of FIG. 5 is placed in STATE 1. STATE 1 corresponds to block 510 in FIG. 4 which indicates that registers AA and BB are to be right shifted jointly one bit at a time (i.e., one pel at a time) until the first occurrence of an up-transition ("0" to "1" transition) in *either* register AA or BB. When such a transition is detected, STATE 1 terminates, shifting stops, and the distance, DIS, between the detected up-transition and the undetected up-transition in the other register is measured in decision block 520. The distance DIS is positive if the register BB up-transition occurs first, and is negative if the register AA transition occurs first. The exact value of DIS is evaluated to the extent of ascertaining whether it is less than $-3$, equal to $-3$, $-2$, $-1$, 0, 1, 2, 3, or greater than $+3$. The calculation of DIS requires no register shifts as it is made in the processor 200 from the plurality of output signals from register AA.

Figure 4:
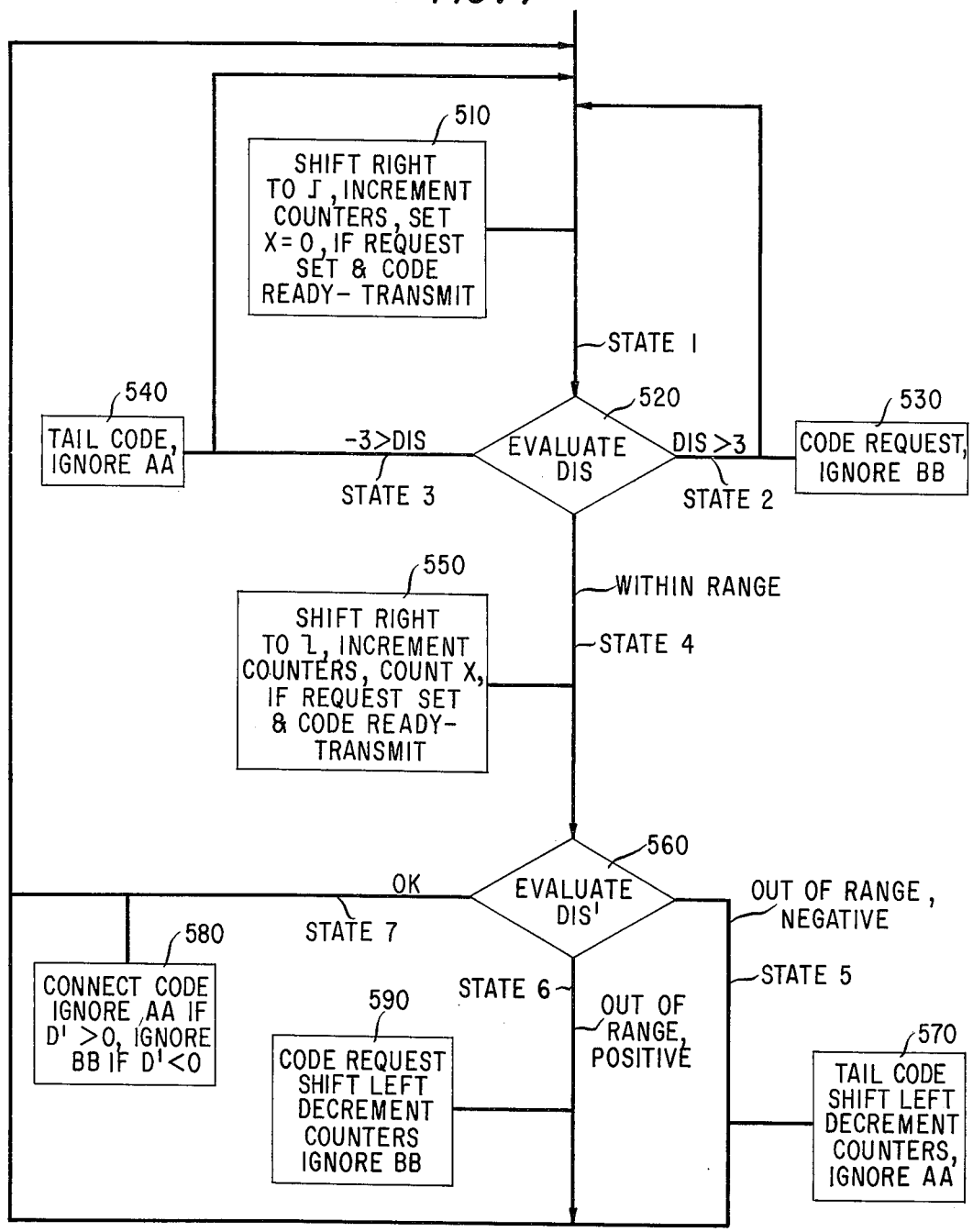
FIG. 4 is a flow diagram of another method of this invention and the operational flow of the encoder of this invention.

For DIS positive and greater than $+3$, the encoder branches from STATE 1 to STATE 2, corresponding to block 530 in FIG. 4. According to block 530, STATE 2 indicates that the run in register BB is a head run. Therefore, a "code request" register in control element 300 is set to indicate that when the length of the head is determined, i.e. when the next down-transition in register BB occurs, then a head code should be transmitted, and an "ignore BB" register is set in control element 300, developing an "ignore BB" control signal which causes "1s" in register BB to be ignored when searching for subsequent up-transitions, until after a down transition is detected in register BB. With the "code request" and "ignore BB" registers thus set, the encoder returns, per the flow diagram of FIG. 4, to STATE 1.

During the shifting operation of STATE 1, three separate counters are incremented. The first, $C_1$ counter, is a pel position counter. This counter keeps track of the position of the pel being processed and provides an indication whenever a line has been processed completely. The second, $C_2$ counter, counts strings of "1s" in register BB (non-background image runs) and the third, $C_3$ counter, counts strings of "0s" in register BB. Thus, counter $C_2$ provides an indication of run lengths in register BB and counter $C_3$ provides an indication of distances between runs. When a down-transition in register BB is detected, both the run length and distance are indicated by the contents of counters $C_2$ and $C_3$, respectively. Therefore, at that time the contents of counters $C_2$ and $C_3$ which are connected to subsequent circuits within processor 200 are converted within those circuits to the appropriate head-code for the run length and position. Consequently, when a down-transition in register BB is detected, the head code is transmitted, the "code request" register is reset and the "ignore BB" register is also reset (because of the down-transition detection).

When DIS is more negative than −3, the encoder branches from STATE 1 to STATE 3, which corresponds to block 540 in FIG. 4. STATE 3 is indicative of a tail run condition in register AA. In that case, the occurrence of a tail-run code is generated by processor 200, an "ignore AA" register is set in control element 300, and the encoder returns to STATE 1, ignoring "1s" in register AA when searching for an up-transition until after a down-transition is detected in register AA.

When DIS is between ±3 inclusive, the run-beginning connectivity test is met and the encoder branches to STATE 4 to test the run-ending connectivity. In STATE 4 (block 550 in FIG. 2) registers AA and BB are conditionally shifted right while processor 200 searches for the first down-transition in either register AA or BB. The shifting is conditional because in searching for the first down-transition, an up-transition may be encountered which may need to be considered for a subsequent run-beginning connectivity test (if the tested runs fail the connectivity test). In such a case registers AA and BB must be shifted back (to the left) and the run which failed the run-ending connectivity test i.e. the detected head or tail run would have to be ignored. For example, assume the runs being tested occupy pel positions 2-5 in register AA and 4-9 in register BB, and that the next run in register AA occupies positions 7-9. Then upon reaching the up-transition at pel 2 in register AA, DIS is determined to be −2. The next down-transition occurs in register AA at pel 6. However, prior to this down-transition, the up-transition at pel 4 in register BB is encountered. When the test runs in registers AA and BB fail the run-ending connectivity, either the test run in register AA is a tail run, as in this example, or the test run in register BB is a head run. The run in register BB, however, does connect to the next register AA run in positions 7-9. To process this connection, the registers are shifted back to position 2. Before this shift occurs, if the test run in register AA is a tail run, the tail code is generated, and the "ignore AA" register is set. If the test run in register BB is a head run, the "code request" and "ignore BB" registers are set. In this latter case, in reprocessing this section of the registers, when a down-transition occurs in register BB, since the "request code" register is also set, the appropriate head codes are generated.

In order to determine the number of pels that registers AA and BB may have to be shifted back, a counter X, situated in control element 300, is set to zero in block 510, and is incremented during the right shifts of STATE 4 (block 550). During the right shifts of STATE 4 the computation of run length and distance codes proceeds as in block 510 and in fact, may be completed. In such a case, if the "code request" register is set, the appropriate codes are generated, the "request code" register is reset and the "ignore BB" register is reset.

STATE 4 terminates when a down transition is detected in block 550. At this point, the encoder of FIG. 5 enters block 560 and branches therefrom to STATES 5, 6, or 7, depending on the distance between the detected down-transition and the undetected down-transition in the other register. This distance, designated DIS', is measured in a manner entirely analogous to the measuring manner of distance DIS.

When DIS' is found to be less than −3, the encoder branches to STATE 5, corresponding to block 570 in FIG. 4 which indicates that the run in register AA, is a tail run. Consequently, a tail-run code is generated and the "ignore AA" register is set. Additionally, registers AA and BB are shifted back (to the left) by a number of bits equal to the count in counter X, and the counters $C_1$, $C_2$, and $C_3$ are decremented by the count in X. When the shifting is completed, the encoder exits STATE 5 and re-enters STATE 1.

When DIS' is found to be greater than +3, the encoder branches to STATE 6, corresponding to block 590 in FIG. 4 which indicates that the run in register BB is a head run. Consequently, the "code request" register is set and the "ignore BB" register is set. Additionally, registers AA and BB are shifted back by a number of bits equal to the count X and counters $C_1$, $C_2$, and $C_3$ are decremented by the count in X. When the shifting is completed, the encoder exits STATE 6 and re-enters STATE 1.

When DIS' is found to be less than or equal to +3 yet greater than or equal to −3, the run-ending connectivity test is met and the encoder of FIG. 5 branches to STATE 7, corresponding to block 580 in FIG. 4. Since both the run-beginning and run-ending criteria are satisfied, it is concluded that the tested run in register BB connects to the run in register AA and forms a part of the blob to which the run in register AA belongs. Accordingly, a connection code is developed based on the values of DIS and DIS' and is provided to the output port of processor 200. In addition to providing a connect code, block 580 also sets either the "ignore AA" register or the "ignore BB" register as follows. A positive DIS' indicates that the detected down-transition is in register BB and that, therefore no "1s" exist in register AA that need to be ignored. Accordingly, when DIS' is greater than zero, only the "ignore AA" register is set during STATE 7 before branching to STATE 1. If DIS is equal to zero, neither register AA nor register BB need to be ignored. A negative DIS', however, indicates that the detected down-transition is in register AA and that, therefore no "1s" exist in register AA that need to be ignored. Accordingly, when DIS' is less than zero, only the "ignore AA" register is set during STATE 7 before branching to STATE 1.

It has been stated above that in STATES 5 and 6 registers AA and BB are required to be left shifted to bring back the information that have previously been right shifted (and out of the registers) during STATE 4. Accordingly, it is necessary for the right-shift to be a non-destructive shift, i.e., the information shifted out of registers AA and BB should be stored in a temporary store. Conveniently, a non-destructive right-shift can easily be accomplished because storage is available in registers AA and BB (made available by the right-shifts) which may be employed by connecting the output terminal of each register to its input terminal. Alternatively, the output terminal of register AA may be connected to the input terminal of register BB, and vice versa. The latter interconnection is believed preferred because the contents of register BB must, in any event, be loaded into register AA at the end of the processing of each scan. With the preferred interconnection described above (illustrated in FIG. 5), at the end of processing a line, register AA already contains the contents of register BB, this having been accomplished automatically during the processing cycle, requiring only the switch 210 which interrupts the register AA-to-register BB interconnection and connects scanner 100 to register BB at the end of a scan's processing.

Processor 200

Although processor 200 is the main and only processor of the encoder of FIG. 5, its tasks are quite simple and its construction is straightforward. This can be appreciated from a study of the tasks required of processor 200, which are:

(1) to detect up-transistions;
(2) to evaluate DIS;
(3) to detect down-transitions;
(4) to evaluate DIS';
(5) to generate head codes, connect codes, and the tail code; and
(6) be able to ignore logic level "1" bits in registers AA or BB.

Figure 7:
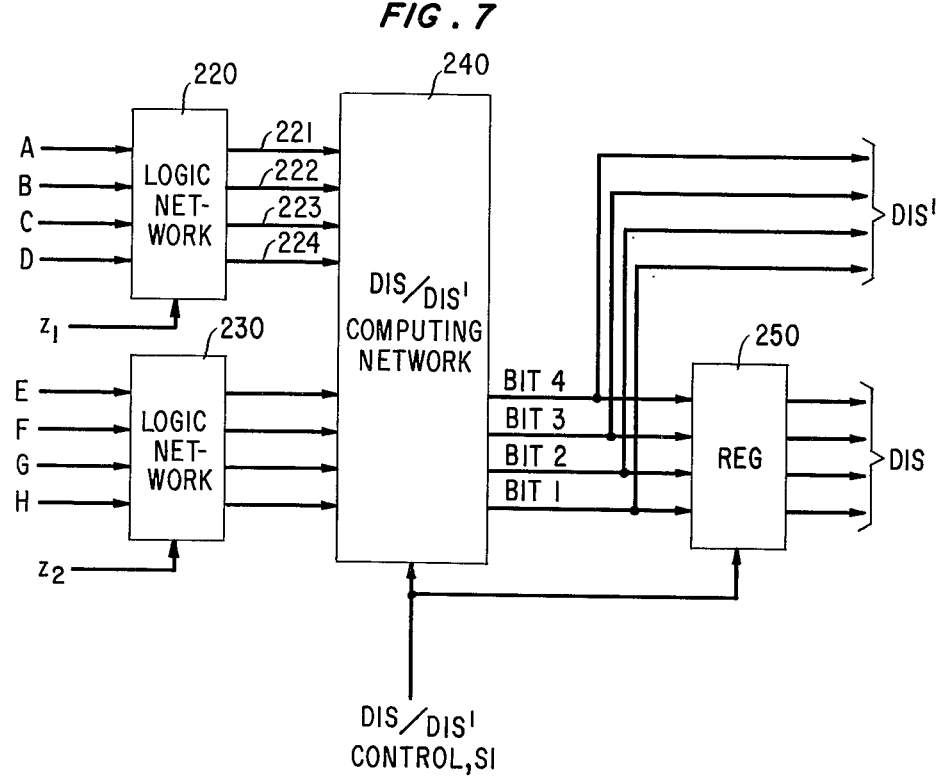
FIG. 7 depicts the distance (DIS/DIS') evaluating circuit useful in the operation of processor 200 of FIG 5.
Figure 6:
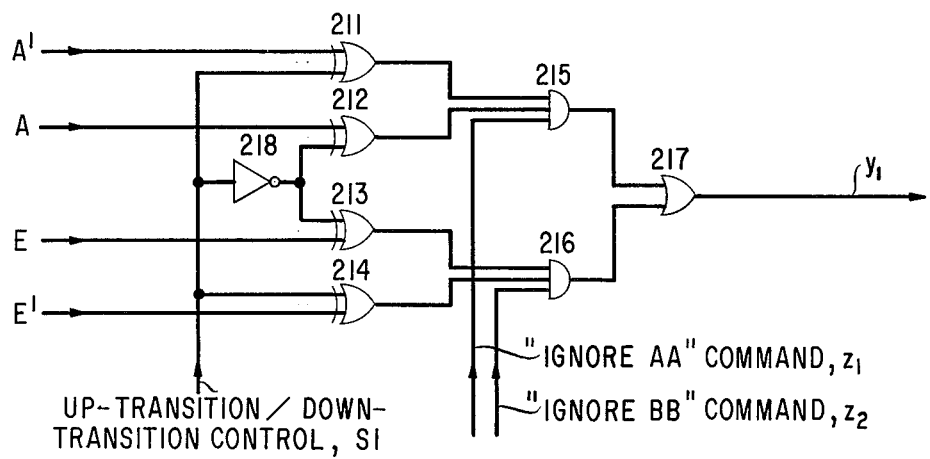
FIG. 6 depicts an up-transition/down-transistion sub-circuit of processor 200 of the encoder of FIG. 5.
Figure 8:
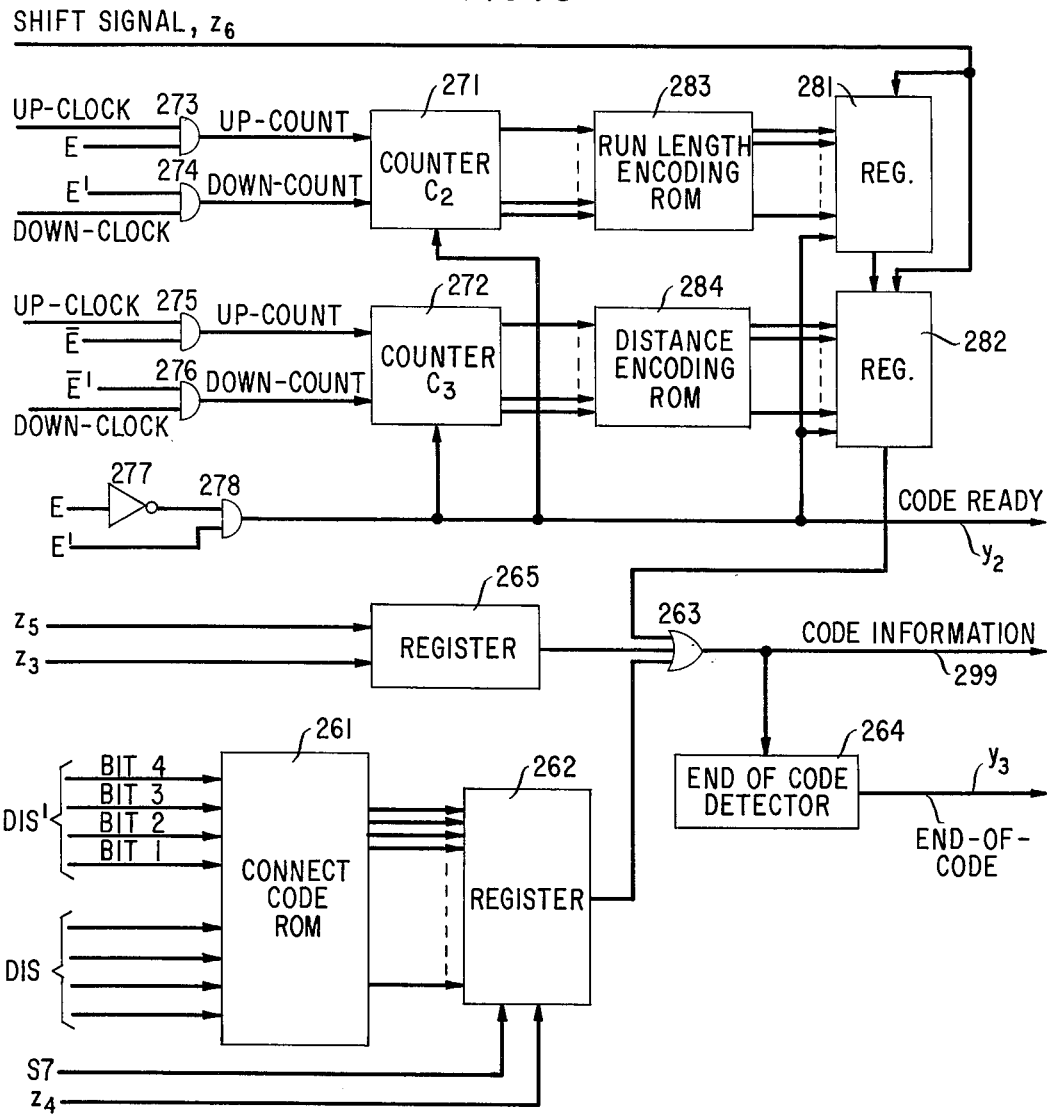
FIG. 8 depicts the code generation sub-circuit of processor 200 of FIG. 5.

FIGS. 6-8 depict some of the constructions that may be employed in providing the necessary capabilities of processor 200.

Detection of up and down transitions (tasks 1 and 3) can easily be implemented by testing the two bits which straddle the transition point. For this purpose, an extra first bit is inserted in registers AA and BB and this extra first bit is used solely for transition detection purposes. FIG. 6 illustrates a detection circuit which is capable of detecting up-transitions as well as down-transitions. Input signals A and A' (representing the first bit and the extra first bit of register AA, respectively) input signals E and E' (representing the first bit and the extra bit of register BB, respectively) are connected to Exclusive OR gates 211, 212, 213, and 214, respectively. Gates 211 and 212 are connected to AND gate 215, gates 213 and 214 are connected to AND gate 216 and gates 215 and 216 are connected to OR gate 217. Additionally, an up-transition/down-transition control signal S1 is connected directly to gates 211 and 214 and connected through inverting gate 218 to gates 212 and 213. Also, an "ignore AA" control signal $z_1$ (task 6) is connected to gate 215 and the "ignore BB" control signal 32 is connected to gate 216. The Boolean expression of output signal $y_1$ of gate 217 is $$y_1 = (A \overline{A'} + E \overline{E'})S_1 + (\overline{A} A' + \overline{E} E)\overline{S_1}. \quad (1)$$

FIG. 7 depicts a general block diagram of a circuit for computing DIS and DIS' (tasks 2 and 4); where inputs A, B, C and D are the first, second, third and fourth outputs of register AA and inputs E, F, G and H are the first, second, third and fourth outputs of register BB. Inputs A, B, C and D are applied in FIG. 7 to logic network 220 controlled by the z1 command, inputs E, F, G and H are applied to logic network 230 controlled by the z2 command, and the outputs of elements 220 and 230 are applied to a combinatorial circuit 240 which evaluates the value of DIS or DIS' depending on the DIS/DIS' control signal S1. The outut signals of circuit 240 are applied to register 250 into which the value of DIS is strobed by the S1 signal.

Elements 220 and 230 comprise disabling circuits that search for a down-transition among the input signals and disable only the inputs that precede such a down-transition. To accomplish such selected disabling, each output signal of elements 220 and 230 must independently be controlled in accordance with the Boolean expressions:

$$\text{output 221 of element 220} = A z_1 \quad (2)$$

$$\text{output 222 of element 220} = B(z_1 = \overline{A}) \quad (3)$$

$$\text{output 223 of element 220} = C(z_1 + \overline{A} + \overline{B}) \quad (4)$$

$$\text{output 224 of element 220} = D(z_1 + \overline{A} + \overline{B} + \overline{C}). \quad (5)$$

Equations 2-5 can be implemented with Inverters, OR gates and AND gates.

As to combinatorial element 240, if bit 1, bit 2, and bit 3 output signals of element 240 are selected to represent the magnitude of the DIS or DIS' signal, and bit 4 output signal is selected to represent the sign, it can be shown that (when DIS is being evaluated) the output signals can be characterized by the following Boolean expressions:

$$\text{bit } 4 = \overline{E}, \quad (6)$$

$$\text{bit } 3 = \overline{A}\,\overline{B}\,\overline{C}\,\overline{D} + \overline{E}\,\overline{F}\,\overline{G}\,\overline{H}, \quad (7)$$

$$\text{bit } 2 = \overline{A}\,\overline{B}\,\overline{C}\,D\,E + \overline{A}\,\overline{B}\,C\,E + \overline{E}\,\overline{F}\,G + \overline{E}\,\overline{F}\,\overline{G}\,H, \quad (8)$$

and $$\text{bit } 1 = \overline{A}\,\overline{B}\,\overline{C}\,D\,E + \overline{A}\,B\,E + \overline{E}\,F + \overline{E}\,\overline{F}\,\overline{G}\,H. \quad (9)$$

Again, the above signals can be implemented with Inverters, OR gates and AND gates.

To evaluate DIS' in element 240, it is only necessary to invert the input signals of element 240. This can be accomplished with eight exclusive OR gates respectively connected to the eight input signals and to the control signal S1.

Once up-transitions and down-transitions are detected and the values of DIS and DIS' are obtained, it is necessary to compute the various codes of the encoder. A circuit which develops those codes is depicted in FIG. 8.

To compute the connect code, the circuit of FIG. 8 provides a connecting code ROM (read-only-memory) 261 responsive to the DIS and DIS' values provided by elements 250 and 240, respectively, and a register 262 which is responsive to ROM 261, to a strobe command S7, and to a shift signal $z_4$. Prior to the encoder's entry into STATE 7 (FIG. 4), the values of DIS and DIS' are available to ROM 261, and ROM 261 presents the appropriate code to register 262. Immediately upon entry into STATE 7, the code is strobed into register 262 with signal S7, and is transferred under control of $z_4$, via OR gate 263, to output terminal 299 of processor 200 to be transmitted to its ultimate destination. While the connecting code is being transmitted, an end-of-code detector 264 keeps track of the transmitted bit stream. When a transmitted code ends, element 264 detects the transmitted end-of-code signal and develops an end-of-code control signal $Y_3$.

Since the tail-run code is but a single code, computation of the tail-run code requires only a register 265 which has the tail code hard wired thereto. At the appropriate times (STATE 3 or STATE 5), the hard wired code is strobed into register 265 (FIG. 8) with control signal $z_3$, and is shifted to the output terminal of processor 200, via gate 263, with a shift signal $z_5$.

To compute the head code, the circuit of FIG. 8 provides a counter $C_2$ (271), which counts the length of runs in register BB, and a counter $C_3$ (272), which measures the distance between runs in register BB. To provide for the proper control signals to counters $C_2$ and $C_3$, appropriate logic is provided by gates 273–278. Specifically, AND gate 273 increments counter 271 when the first bit of register BB (signal E) is a "1" during a right shift, and AND gate 274 decrements counter 271 when the extra first bit (signal E') of register BB is a "1" during a left shift. AND gates 275 and 276 provide the same controls to counter 272, being responsive to the inverse of the first bit and to the inverse of the extra first bit, so that the "0s" in register BB may appropriately be counted. Inverter gate 277 and AND gate 278 are connected to detect the state E'Ē which indicates the termination of a run in register BB. When a run is terminated in register BB, a head code can be transmitted (and in fact is transmitted if a code request register has been set) because the run length is known and because the distance of that run from the previous run is also known. Therefore, the output signal of AND gate 278 $Y_2$, is used to strobe registers 281 and 282, reset counters $C_2$ and $C_3$, and to provide control element 300 with the control signal $Y_2$. Register 281 is responsive to run length encoding ROM 283 which, in turn, is responsive to counter 271. Register 282 is responsive to distance encoding ROM 284 which, in turn, is responsive to counter 272. Thus, immediately prior to the resetting of $C_2$ and $C_3$, ROMs 283 and 284 present to registers 281 and 282, respectively, the appropriate run length code and distance code to be strobed by signal $y_2$ and to be shifted to gate 263 with shift signal $z_6$.

End of code detector 264 may be a full fledged code decoder. Alternatively, ROMs 261 and 283 may provide an indication of the length of each code provided (in addition to the code itself), and such an indication may be detected by element 264 and operated upon to develop the end-of-code control signal $y_3$.

Control Element 300

The nature of the processor 200 does not lend itself to synchronous control because no a priori knowledge is available of the number of right and left shifts that may be necessary in STATES 1, 4, 5 and 6, and because the codes generated by the encoder have, by design, a non-fixed length. Therefore, it is most advantageous for control element 300 to be asynchronous.

Figure 9:
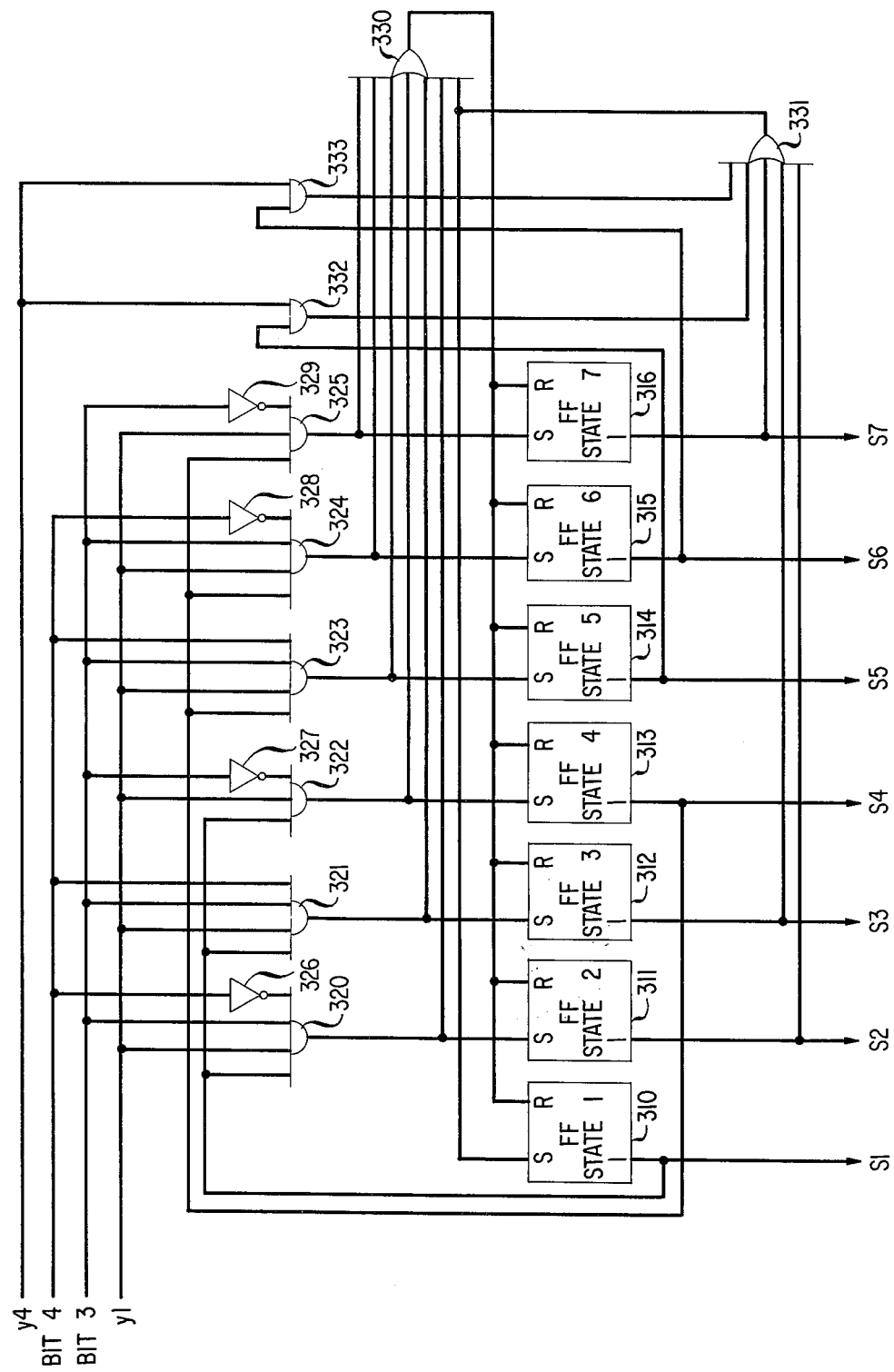
FIGS. 9–10 illustrate one design for control circuit 300 of the encoder of FIG. 5.
Figure 10:
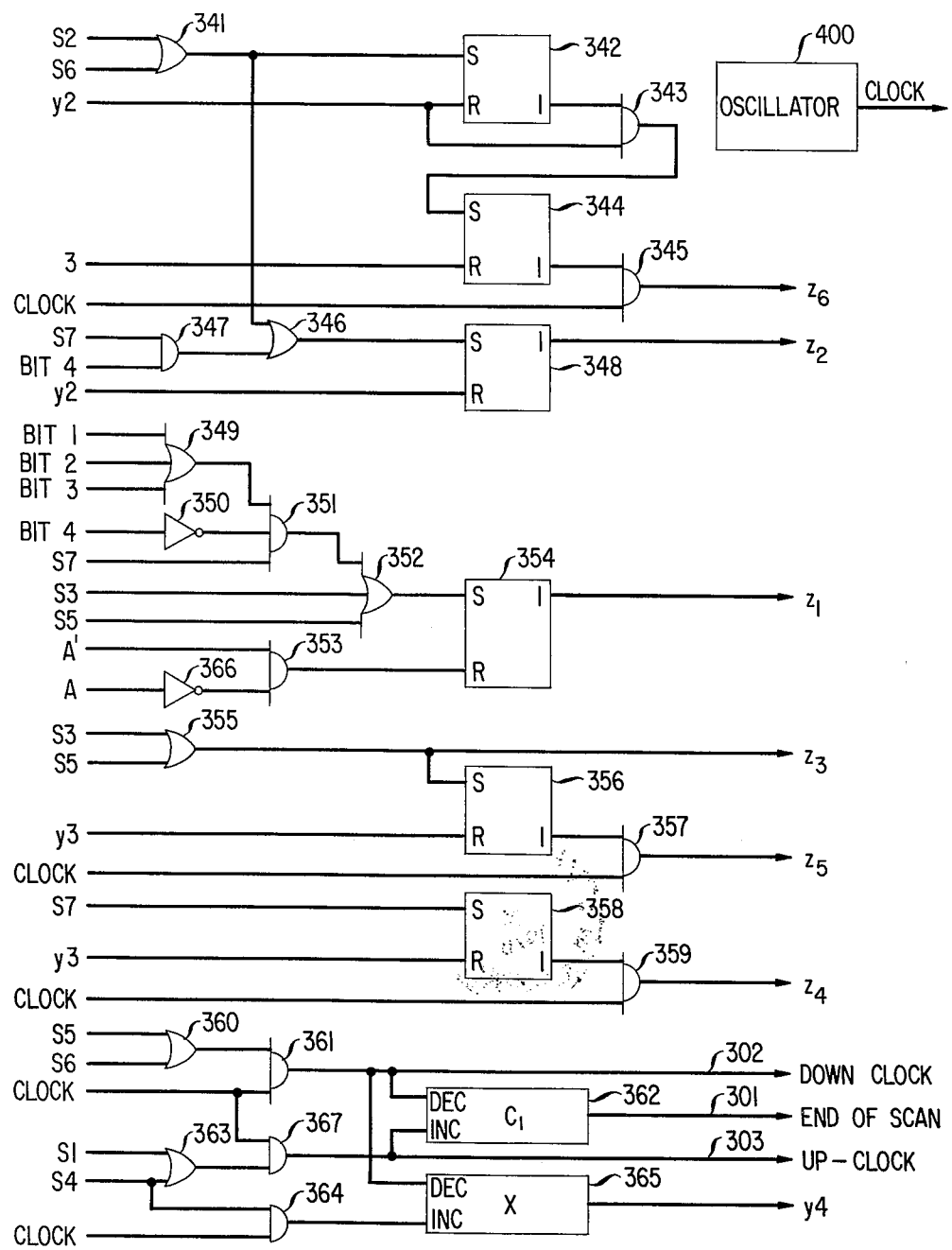

FIG. 9 illustrates one embodiment of the cycle control circuit of control element 300 and FIG. 10 depicts the peripheral logic circuits of element 300.

In FIG. 9, flip-flops (FFs) 310, 311, 312, 313, 314, 315, and 316 determine the state of the encoder. These flip-flops are clocked set-reset flip-flops (i.e., change only during a particular transition of an applied clock) having the characteristic of being set or reset with a logic level "1" at the appropriate inputs, and the additional characteristic of being *set* when both the "set" and "reset" inputs are "1". The output terminal of FF 310 is connected to AND gates 320, 321, 322 and comprises control signal S1. The output terminals of FFs 311, 312, and 316 are connected to OR gate 331 and comprise control signals S2, S3, and S7, respectively. The output terminal of FF 313 is connected to AND gates 323, 324, 325, and comprises control signal S4. The output signals of FFs 314 and 315 are connected to AND gates 332 and 333 respectively and comprise control signals S5 and S6, respectively. The output terminals of gates 320, 321, 322, 323, 324, and 325 are connected to the "set" inputs of FFs 311, 312, 313, 314, 315, and 316, respectively, in addition to all being connected to an OR gate 330. The output terminals of gates 332 and 333 are connected to OR gate 331 which, in turn, is connected to OR gate 330 and to the "set" input of FF 310. The output terminal of OR gate 330 is connected to the "reset" inputs of FFs 310–316.

Gates 320–325 and 330–333 are responsive to their respective flip-flops, as described above, and are further responsive to various control signals so that appropriate branching may occur. Specifically, gates 320–325 are connected to the $y_1$ signal (FIG. 4) which indicates that an up-transition (during STATE 1) or a down-transition (during STATE 4) has occurred, and to the bit 4 and bit 3 leads of combinatorial logic 240 (FIG. 5) which indicate whether DIS and DIS' are out of range and positive, out of range and negative, or within the designated range (±J pels). Gates 332 and 333 are connected to control signal $y_4$, described below, which assumes the level "1" when the correct number of left-shifts have been executed causing the encoder to branch out of STATES 5 and 6 and into STATE 1.

Stepping through the operation of the FIG. 9 cycle control circuit and assuming that the encoder is at STATE 1 (FF 310 is set and all other FFs are reset), it can be shown that the circuit remains in STATE 1 until the signal $y_1$ assumes the logic level "1". When S1 and $y_1$ are equal to "1", gates 320, 321, and 322 are enabled, permitting the values of bit 3 and bit 4 signals to be determinative of which of the three gates assumes the output value "1". When bit 3 is "0", indicating that DIS is within range, gate 322 assumes the level "1" (with the aid of inverter gate 327 that is interposed between the bit 3 signal and gate 322), causing the next clock pulse to set FF 313 and to reset FF 310, thereby branching to STATE 4. When bit 3 signal is "1", indicating that DIS is outside the range, bit 4 signal equal to "1" causes gate 321 to assume the level "1" which in turn causes FF 312 to be set and FF 310 to be reset, thereby branching to STATE 3. When bit 3 signal is "1" and when bit 4 signal is "0", gate 320 assumes level "1", which causes FF 311 to be set and FF 310 to be reset, thereby branching to STATE 2.

When STATES 2, 3, or 7 are reached, or when STATES 5 or 6 are reached and $y_4$ is at logic level "1", gate 331 causes FF 310 to set (while the other FFs are reset by gate 330), branching the encoder to STATE 1.

When STATE 4 is reached, the circuit remains in STATE 4 until the signal $y_1$ again assumes the logic level "1". When S4 and $y_1$ are equal to "1", gates 323, 324, and 325 are enabled permitting the values of the bit 3 and bit 4 signals to be determinative of which of the three gates assumes the level "1". With logic interconnections similar to those associated with gates 320–322, gate 323 is enabled when DIS' is out of range and negative, gate 324 is enabled when DIS' is out of range and positive and gate 325 is enabled when DIS' is within range.

FIG. 10 depicts the circuitry for generating the control signals necessary for operating the encoder of FIG. 5. The logic of FIG. 10 may be most effortlessly understood when it is perused in conjunction with the flow diagram of FIG. 4. Most of the tasks required by FIG. 4 have corresponding circuitry in FIG. 10.

When a head run is detected in either STATE 2 or STATE 6, a "code request" register must be set so that when code information is avaiable (during STATES 1 or 4), it can immediately be transmitted onto output lead 299 of processor 200. In accordance with FIG. 8, the code information for a head run is made available every time the signal $y_2$ assumes the level "1". When $y_2$ assumes the level "1", the code strobed into registers 281 and 282 is shifted to gate 263 with the aid of shift signal $z_6$. To achieve the shifting operation, the circuit of FIG. 10 develops shift signal $z_6$ by employing FFs 342 and 344 and gates 341, 343, and 345. To derive the $z_6$ signal, control signals S2 and S6 are ORed in gate 341 and are connected to the "set" input of FF 342. Flip-flop 342 serves as the "code request" register and is reset by signal $y_2$ which indicates that a code is being transmitted. The output signal of flip-flop 342 and the signal $y_2$ are connected to AND gate 343 which, in turn, is connected to the "set" input of FF 344 which when set generates signal $z_6$. Flip-flop 344 is arranged, with AND gate 345 and a clock signal, to enable the clock signal, providing thereby the shift signal $z_6$. Shift signal $z_6$ is disabled by resetting FF 344 with control signal $y_3$ derived from end-of-code element 264 of FIG. 8.

Whenever the encoder reaches STATES 2 and 6 and, occasionally when the encoder reaches STATE 7, an "ignore BB" command signal $z_2$ must be generated and must remain in effect until a down-transition is detected in register BB. Signal $z_2$ is generated in a FF 348 by connecting control signal S7 and the bit 4 signal to an AND gate 347, by connecting the output signal of AND gate 347 and the output signal of OR gate 341 to an OR gate 346 which, in turn, is connected to the "set" lead of a FF 348. Flip-flop 348 is reset with control signal $y_2$.

Whenever the encoder reaches STATES 3 and 5, and, occasionally when the encoder reaches STATE 7, an "ignore AA" command signal $z_1$ must be generated and must remain in effect until a down-transition in register AA is detected. To generate signal $z_1$, control signal S7 is connected to an AND gate 351 to which the bit 4 signal is connected through inverter 350 and to which the bit 1, bit 2, and bit 3 signals are connected through an OR gate 349. The output signal of AND gate 351 is connected to OR gate 352 to which control signals S3 and S5 are also connected, and gate 352 is connected to the "set" lead of FF 354. Flip-flop 354, which develops the signal $z_1$, is reset with a down-transition detector which comprises AND gate 353 responsive to signal A' and to signal A inverted with gate 366.

Upon branching to STATES 3 or 5, a tail code must be transmitted. This is accomplished in the circuit of FIG. 8 by strobing register 265 with control signal $z_3$ and by shifting the contents of register 265 to gate 263 with shift signal $z_5$. Signal $z_3$ is generated in the circuit of FIG. 10 with an OR gate 355 responsive to control signals S3 and S5. Signal $z_3$ initiates shifting signal $z_5$ by setting FF 356 which, in turn, enables the clock signal through AND gate 357. Signal $z_5$ terminates when the end-of-code signal $y_3$ resets FF 356.

When the encoder branches to STATE 7, a connect code must be transmitted. Accordingly, when STATE 7 is reached, register 262 (FIG. 8) is strobed with control signal S7 and shifted to gate 268 by a shift signal $z_4$. Signal $z_4$ is provided in the circuit of FIG. 10 with FF 358 that is set with signal S7, thereby enabling the clock signal through AND gate 359. As before, when an end-of-code condition is detected in element 264, shift signal $z_4$ is disabled with signal $y_3$ which is connected to reset FF 358.

In generating the value of the run length and the value of the distance between runs, counters $C_2$ and $C_3$ in FIG. 8 must be incremented during right shifts and decremented during left shift. For this purpose, the FIG. 8 circuit calls for an up-clock and a down-clock applied to gates 273–276. The up-clock is the right-shift clock which occurs only during STATES 1 and 4, and the down-clock is the left-shift clock which occurs only during STATES 5 and 6. Accordingly, the circuit of FIG. 10 generates the up-clock with AND gate 367 which is responsive to the clock signal and to an OR gate 363 that is responsive to control signals S1 and S4. The down-clock is generated with AND gate 361 which is responsive to the clock signal and to an OR gate 360 that is responsive to control signals S5 and S6.

In accordance with FIG. 4, during STATE 4 a parameter designated X must be incremented (block 550) so that when STATES 5 or 6 are reached, the required number of left-shifts would be known. For this purpose, the circuit of FIG. 10 provides a counter 365 which is incremented with a signal derived from gate 364 that is connected to the clock signal and to control signal S4. During STATE 5 or STATE 6, counter 365 is decremented so that the cessation of left shifts may be controlled by detecting the STATE "0" of counter 365. To decrement counter 365, the down-clock signal of gate 361 is connected to the decrementing input of counter 365. The output signal of counter 365 is the signal $y_4$ which assumes the logic level "1" whenever counter 365 reaches STATE "0".

In order to control switch 210 in FIG. 5, it is necessary to ascertain the condition of a scan termination. The scan termination information is provided with counter $C_1$ (362) in FIG. 10, whose incrementing input is connected to the up-clock, whose decrementing input is connected to the down-clock and whose output, 301, which controls the position of switch 210 assumes the value "1" whenever counter $C_1$ reaches the state which corresponds to the number of pels in each scan.

Finally, the circuit of FIG. 10 includes element 400 which is an oscillator of standard design providing the clock signal which controls all the processes of the encoder.

It is to be understood that the embodiments shown and described herein are merely illustrative of the principles of this invention and that modifications may be implemented without departing from the spirit and scope of this invention. For example, when a run-beginning connectivity between two runs is met but a run-ending connectivity fails, another run-beginning and run-ending connectivity test may be required for one of the runs involved in the failed run-ending test. Considerable hardware saving may be achieved by refraining from the secondary test and simply assigning a tail code and head code for the runs that failed the run-ending connectivity test. With such a method, there would indeed be some inefficiency that would result in assigning a tail code and a head code in situations where a connect code would suffice. However, it is believed that these inefficiencies would occur only rarely, and the hardware saving may be significant since registers AA and BB would no longer be required to be left shifted, STATE 5 and 6 could merge, all counters would be only up-counters, the X counter would not be needed, and probably the "ignore AA" and "ignore BB" control signals could be eliminated.

What is claimed is:

1. Apparatus for encoding two dimensional blobs defined by a plurality of runs from a sequence of consecutive scans, which runs meet the connectivity criteria that runs of consecutive scans have run-beginnings and run-endings that are no more than J pels apart and that only one run in a scan connect to the same run in a preceding scan, comprising:

means for placing each scan in a first register and its immediately preceding scan in a second register;

means for shifting the contents of both said registers and applying to their output signals said connectivity criteria;

means for assigning a connect code to runs in said first register for which such connectivity criteria are met; and means for assigning a head code to runs in said first register and a tail code to runs in said second register for those runs that fail to meet said connectivity criteria.

2. Apparatus for encoding two-dimensional pictorial entities by scanning an image with parallel scans and by encoding the pictorial information of each scan in relation to the pictorial information of the immediately preceding scan comprising:

means for storing the information of each scan within a first register and the information of its preceding scan within a second register;

means for shifting said first and second registers one bit at a time to provide, following each shift operation, one picture element of information regarding said scans stored in said registers; and means for processing said picture element information derived from said shifting to ascertain compliance with predetermined connectivity criteria, said means for processing comprising means for determining that runs of constant tone in said first and second registers begin and end within ±J pels of each other, in which case they are said to connect, and means for determining that only a single run in said first register is connected to a particular run in said second register.

3. Apparatus for encoding two dimensional pictorial entities situated on a page of graphic information for transmission comprising:

means for consecutively scanning adjacent lines of said page and deriving therefrom electrical signal information regarding encountered constant tone runs belonging to said pictorial entities;

means for testing signals representing each scan as said scan is obtained by relating encountered runs in the tested scan to encountered runs in the scan immediately preceding said tested scan to determine whether runs exist in said preceding scan to which each of the runs in said tested scan may connect;

means, responsive to said testing means, for developing an electrical code which characterizes each of said encountered runs in said tested scan as either a head-run indicating the beginning of a pictorial entity, or as a connecting-run indicating the connecting of the run to a previous run;

means, responsive to said testing means, for developing an electrical code which characterizes each of said encountered connecting-runs in said preceding scan not connected in said tested scan, as tail runs; and means for transmitting said developed codes concurrently with the development of said codes.

4. Apparatus according to claim 3 wherein said testing means comprises means for testing that each encountered run in a said tested scan is bounded to a neighborhood area in said immediately preceding scan that is geometrically related to each of said encountered runs in said tested scan.

5. Apparatus according to claim 4 where said testing means includes:

means for relating the beginning of each run in said tested scan to the neighborhood area in said preceding run that is geometrically related to said beginning of each run; and means for relating the ending of each run in said tested scan to the neighborhood area in said preceding run that is geometrically related to said ending of each run.

6. Apparatus according to claim 4 where said testing means includes:

first means for searching said preceding scan for a run-beginning within a neighborhood of J pels of the run-beginning of each encountered run in said tested scan;

means for assigning a head code to each run in said tested scan for which said first means for searching is unsuccessful;

second means for searching said preceding scan for a run-ending within a neighborhood of J pels of the run-ending of each of said encountered runs in said tested scan for which said first means for searching is successful;

means for assigning a head code to each run in said tested scan for which said second means for searching is unsuccessful, and a connect code to each run in said tested scan for which said first and second means for searching are successful; and means for assigning a tail code to each run in said preceding scan which is not associated with a run in said tested scan that is assigned a connect code.

7. Apparatus for encoding two dimensional blobs defined by a plurality of runs from a sequence of consecutive scans, which runs meet the connectivity criteria that runs of consecutive scans have their respective run-beginnings and run-endings that are no more than J pels apart and that only one run in a scan connect to the same run in a preceding scan comprising:

means for placing each scan in a first register and its immediately preceding scan in a second register;

first means for shifting the said first and second registers until a run-beginning is detected at the output of either of said registers;

first means for searching within a range of J pels for run-beginnings in the register within which a run-beginning has not been detected by said first means for shifting;

means for assigning a head code if the detected run-beginning in said first step of shifting is in said first register and said first means for searching is unsuccessful, and a tail code if the detected run-beginning is in said second register and said first means for searching is unsuccessful;

second means for shifting said first and second registers until a run-ending is detected at the output of either of said registers;

second means for searching within a range of J pels for run-endings in the register within which a run-ending has not been detected by said second means for shifting;

means for assigning a head code if the run-ending detected by said second means for searching is in said first register and said second means for searching is unsuccessful, and a tail code if the run-ending detected by said second means for shifting is in said second register and said second means for searching is unsuccessful;

means for reenabling said second means for shifting and said second means for searching if said first means for searching detects more than a single run-beginning in said register within which a run-beginning has not been detected by said first means for shifting; and means for assigning a connect code if said means for searching is successful and said second means for searching is successful.

8. Apparatus for encoding two-dimensional pictorial elements of an image page comprising:

a first register for storing therein the pictorial information of each picture element in a scan of said image page;

a second register for storing therein the pictorial information of each picture element in a scan of said image page that is immediately preceding the scan stored in said first register;

means for processing to develop a sequence of codes representative of the pictorial information contained in said first and second registers, said means for processing including first means for detecting run-beginnings and run-endings in either of said first and second registers;

second means for determining the distance between run-beginnings in said first and second registers and determining the distance between run-endings in said first and second registers;

third means for detecting run lengths and distances between runs in said first registers; and fourth means for generating head codes based on the information derived by said third means, tail codes, and connect codes based on the information derived by said first and second means; and means for controlling said means for processing to perform predetermined connectivity tests and to develop said sequence of codes, and for controlling the shifting of information within said first and second registers.

* * * * *